F. A. BERG.
SHUTTER FOR MOTION PICTURE MACHINES.
APPLICATION FILED OCT. 30, 1914.

1,160,824. Patented Nov. 16, 1915.

Witnesses:
C. E. Vessels
A. A. Olin

Inventor,
Frederick A. Berg,
By Joshua R. H. Potts
his Attorney.

UNITED STATES PATENT OFFICE.

FREDERICK A. BERG, OF CHICAGO, ILLINOIS.

SHUTTER FOR MOTION-PICTURE MACHINES.

1,160,824.  Specification of Letters Patent.  Patented Nov. 16, 1915.

Application filed October 30, 1914. Serial No. 869,428.

*To all whom it may concern:*

Be it known that I, FREDERICK A. BERG, a citizen of the United States, and a resident of the city of Chicago, county of Cook, and State of Illinois, have invented certain new and useful Improvements in Shutters for Motion-Picture Machines, of which the following is a specification.

My invention relates to improvements in shutters for motion picture machines and has for its object the production of a shutter of this character, through the employment of which flickering upon the screen in the operation of the motion picture machine will be eliminated.

A further object is the production of a shutter which will be of simple construction and efficient in use.

Other objects will appear hereinafter.

The invention consists in the combinations and arrangements of parts hereinafter described and claimed.

The invention will be best understood by reference to the accompanying drawing forming a part of this specification, and in which—

Figure 1:
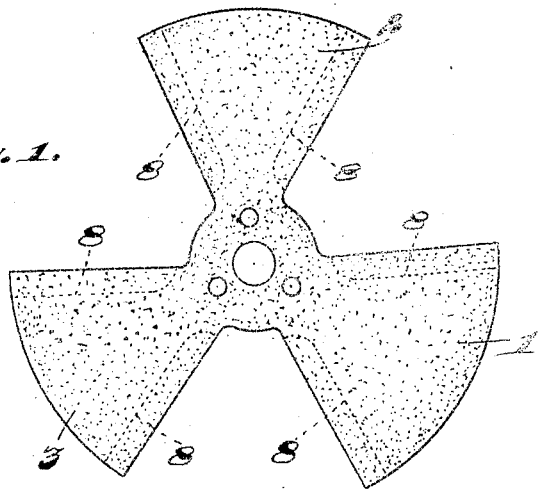
Figure 2:
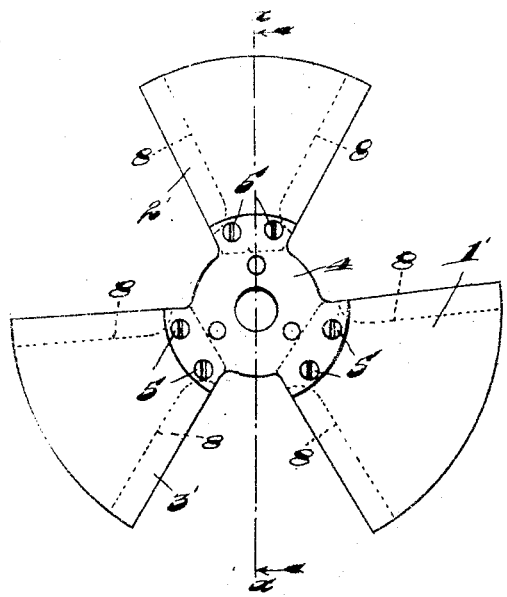
Figure 3:
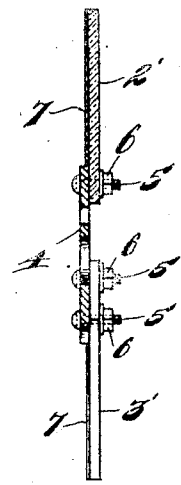

Figure 1 is a rear elevation of a shutter embodying my invention, Fig. 2 is a front elevation of another form of shutter embodying my invention, and Fig. 3 is a section taken on line $x$—$x$ of Fig. 2.

The preferred form of construction as illustrated in the drawing comprises a shutter the outline of which is of conventional design, comprising blades 1, 2 and 3. The number of blades employed in the shutter is of course unimportant inasmuch as all are identical in construction, and each in itself embodies the invention. The blades 1, 2 and 3 are formed of glass, mica or other suitable transparent or semi-transparent material, said blades, in the form shown in Fig. 1 being formed integral. The central portion of the integral body thus formed is provided with an opening for the accommodation of the rotary spindle to which the shutter is attached, a plurality of smaller openings being provided around the central opening for the accommodation of securing devices. If desired however the shutter blades may be formed separate as shown in Figs. 2 and 3 where said blades, indicated as 1', 2' and 3' are connected with a central metallic portion 4 by means of screws 5 and coöperating nuts 6.

Each of the blades of the shutter is provided at its front side with a coating 7 composed of particles of lustrous material, such as quick-silver or mercury; or silver, gold, aluminum or bronze paint adapted, when applied to the shutter, to crystallize or form into an uneven surface presenting myriads of minute bright, shining faces adapted to reflect light impinging thereon in all directions. The opposite side of each shutter blade is ground, frosted, etched or sand blasted, and the edge portions 8 of the front side of said blades are correspondingly ground, frosted, etched or sand blasted, before the application of the coating 7 in order to render said edge portions less transparent and more opaque than the central portion of the blade.

With the construction set forth a shutter is produced which is semi-transparent or translucent, permitting of the passage therethrough of approximately sixty-six per cent. of the light from the source of illumination when the shutter is in traversing position. However through the coating of lustrous material on one side of the shutter and the frosted or ground formation of the other side, the light from the source of illumination will be reflected in all directions by the myriads of minute lustrous or reflecting surfaces which are constituted by the particles composing the lustrous coating and which result from the grinding or frosting of the surface of the glass or other material employed so as to so thoroughly diffuse the light that the movement or travel of the film such as occurs, as is known, when the shutter is in traversing position, will be unnoticed upon the screen. It is of course known that flickering upon the screen is caused by the alternate darkening and lighting of the screen which occurs by reason of the passage of the shutter in front of the lens. The darkening of the screen results from the use of an opaque shutter such as is in general use at the present time. However with a shutter of the construction set forth, the screen instead of being blackened or totally darkened through the traversing position of the shutter, will be simply darkened slightly to a soft gray or silver white. The total darkening of the screen being eliminated, the flickering will necessarily be done away with.

It is understood that shutters of a semi-transparent or translucent formation have been used before, but the same have been unsuccessful in that, when in use, the movement of the film has been transferred therethrough onto the screen thereby resulting in the production of a hazy streaked picture on the screen, the streaks being the result of the movement of the film transferred through the shutter as will be readily understood. Up to the present the failure of a semi-transparent or translucent shutter has been due to the fact that the light has not been thoroughly diffused in its passage through the shutter, the surface of shutters of this class heretofore used not having been coated with a lustrous material or frosted to produce the myriads of reflecting surfaces above referred to. Through the construction employed the thorough diffusion of the light passing through the shutter is accomplished with the result that the movement of the film is not all apparent upon the screen. Very good results are obtained by simply coating the shutter with the lustrous material, it having been found however that the best results are obtained when the shutter is provided with a coating of lustrous material on one side and with the other side ground or frosted.

It has been found through experiment that by frosting the radial edge portions 8 at the front side of the shutter blades so as to render said portions less transparent and more opaque, the pictures projected onto the screen are rendered free from haze and travel ghosts or in other words more distinct and clear cut.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A shutter for motion picture machines comprising a transparent or semi-transparent body provided with a coating of lustrous material adapted to diffuse light impinging thereon, substantially as described.

2. A shutter for motion picture machines comprising a transparent or semi-transparent body provided on one side with a coating of lustrous material adapted to diffuse light impinging thereon, substantially as described.

3. A shutter for motion picture machines comprising a transparent or semi-transparent body provided on one side with a coating of lustrous material and having its opposite side ground or frosted, substantially as described.

4. A shutter for motion picture machines comprising a transparent or semi-transparent sector shaped body provided with a coating of lustrous material and having its radial edge portions less transparent than the remainder of said body, substantially as described.

5. A shutter for motion picture machine comprising a transparent or semi-transparent sector shaped body provided on one side with a coating of lustrous material, the opposite side of said body being ground or frosted, and the radial edge portions of said body being less transparent than the remainder thereof, substantially as described.

6. A shutter for motion picture machines comprising a transparent or semi-transparent sector shaped body provided on one side with a coating of lustrous material, the radial edge portions of said side of said body being ground or frosted, and the opposite side of said body being ground or frosted, substantially as described.

7. A shutter for motion picture machines comprising a transparent or semi-transparent body, the outer surface of which is composed of a great number of minute reflecting surfaces adapted to reflect light impinging thereon in all directions, substantially as described.

In testimony whereof I have signed my name to this specification in the presence of two subscribing witnesses.

FREDERICK A. BERG.

Witnesses:
JOSHUA R. H. POTTS,
ARTHUR A. OLSON.